United States Patent [19]

Watanabe

[11] 3,840,381

[45] Oct. 8, 1974

[54] TITANIUM COATED PIGMENTS

[75] Inventor: Akira Watanabe, Tokyo, Japan

[73] Assignee: Nikon Kogen Kogyo Co., Ltd., Tokyo, Japan

[22] Filed: July 12, 1972

[21] Appl. No.: 271,119

Related U.S. Application Data

[63] Continuation-in-part of Ser. No. 86,628, Nov. 3, 1970, abandoned, which is a continuation-in-part of Ser. No. 808,609, March 19, 1969, abandoned.

[30] Foreign Application Priority Data

Mar. 28, 1968 Japan.............................. 43-019737

[52] U.S. Cl................ 106/291, 106/300, 106/306, 106/308 B
[51] Int. Cl............................................. C09c 1/28
[58] Field of Search......... 106/291, 300, 306, 308 B

[56] References Cited
UNITED STATES PATENTS

| | | | |
|---|---|---|---|
| 2,744,028 | 5/1956 | Grave | 106/306 |
| 3,087,828 | 4/1963 | Linton | 106/291 |
| 3,087,829 | 4/1963 | Linton | 106/291 |
| 3,582,382 | 6/1971 | Watanabe | 106/291 |

*Primary Examiner*—Delbert E. Gantz
*Assistant Examiner*—J. V. Howard
*Attorney, Agent, or Firm*—Armstrong, Nikaido & Wegner

[57] ABSTRACT

A composite nacreous pigment exhibiting a high degree of pearly luster is made by uniformly coating transparent to translucent thin platelets of single crystals of barium sulfate with a homogeneous transparent to translucent thin film of titanium dioxide formed by the hydrolysis in aqueous media of titanium tetrachloride, a water-soluble titanium ester or a water-soluble titanium salt. The hydrous titanium hydroxide film attached to the surface of the barium sulfate crystal is heated to a high temperature to convert the film to titanium dioxide. The pigment thus prepared can be dispersed, if desired, in a transparent or semi transparent light-transmitting medium. The thickness of the individual crystals can be controlled to provide a white lustrous product or a lustrous product colored by optical interference phenomena.

9 Claims, 2 Drawing Figures

PATENTED OCT 8 1974　　　　　　　　　　　　3,840,381

INVENTOR.
AKIRA WATANABE
BY J. E. Armstrong
Attorney

TITANIUM COATED PIGMENTS

CROSS-REFERENCE TO RELATED APPLICATIONS

This application is a continuation-in-part of my prior U.S. Application Ser. No. 86,628, filed Nov. 3, 1970 now abandoned, which, in turn, is a continuation-in-part of a prior U.S. Application Ser. No. 808,609, filed Mar. 19, 1969, now abandoned.

BACKGROUND OF THE INVENTION

For many years titanium dioxide has been considered to be an excellent substance from which to make nacreous pigments of superior characteristics. Many attempts have been made to provide an economical process for the production of such pigments by preparing the titanium dioxide in the form of thin, lustrous flakes or platelets. The essential difficulty involved in devising such a process is that titanium dioxide does not crystallize as platelets or flakes. It has, therefore, been necessary to devise special methods to produce thin platelets of titanium dioxide from titanium salts, such as titanium tetrachloride and lower alkyl titanium esters.

Because of the difficulty in preparing platelets or flakes of titanium dioxide, it has been proposed to produce a titanium dioxide film on a flake substrate. One method of accomplishing this is described in Japanese patent SHOWA-35-5367, published May 18, 1960. This method consists of depositing hydrous titanium dioxide on a flake substrate from a solution of an oil-soluble organic titanate. To the non-aqueous reaction medium there is added sufficient water to effect hydrolysis of the titanium ester. A number of materials are suggested as being useful as the flake substrate, including barium oxylate, zinc hydroxide, and barium sulfate. The crystals to be used as the substrate are grown from aqueous solutions having a concentration of about 0.4–0.5 percent by weight and thereafter separated and added to the organic media into which the titanium ester is introduced. This method requires a comparatively large quantity of solvent and the use of an oil-soluble titanium ester. Variations in particle size because of the difficulty in controlling the rate of growth of the substrate crystals and the thickness of the deposited film of hydrous titanium oxide produce a large number of opaque crystals; the end result being that the luster of the final product is low. Mass production according to this method is difficult because of the problems of control and the extensive physical handling of the materials. Although satisfactory results can sometimes be obtained on a laboratory scale, the method is not commercially practical.

The use of mica as a flake substrate has also been considered. According to Japanese patent SHOWA-39-28885, a thin layer of titanium dioxide can be attached to the surface of the mica by contact with titanic acid ester in non-aqueous media or with a mist or vapor formed by mixing titanium tetrachloride with hot air. Titanium dioxide is produced on the surface of the crystals by hydrolysis of the titanium tetrechloride or titanic acid ester.

Both natural and synthetic mica have been considered as a substrate for titanium dioxide nacreous pigments. Unfortunately, presently available synthetic mica is physically unstable; that is, it can be easily fragmented into particles of varying size. Sizing of the mica is a serious problem, even if it is attempted to provide a relatively uniform particle size using ball mills, roll mills, or supersonic waves. However, the basic defect of synthetic mica is its uneven surface. Even using the most modern equipment, it is impossible to make consistently uniform thin particles having a smooth, even flat surface. Many of the synthetic mica particles are produced as a fine powder which has jagged sides and surfaces, making it unsuitable as a substrate for pearl pigment. Therefore, even if it is possible to control the thickness of the thin layer of titanium dioxide on the surface, it is not possible to achieve, using these crystals, the multiple reflection required for a high luster, because of the scattering of light.

In commercial practice natural mica is therefore preferred over synthetic mica. However, natural mica contains a considerable amount of mud, iron salts, and other contaminants, the amount of contaminants varying with the source from which the mica is obtained. Even by pulverizing and washing natural mica, it is impossible to eliminate all of the impurities. The contaminants are therefore carried into the final product, which causes discoloration.

The commercially available titanium-coated mica does not have the pure white luster achieved with, for example, pigments made from basic lead carbonate. In the casting of pigment-containing polyester resins or polymethylmethacrylate, the mica particles are sometimes exposed in the cast sheet or the titanium layer is separated from the surface of the mica. The exposure of oxidizable materials within the mica causes oxidation or other chemical changes which produce a yellowing of the product. Furthermore, natural mica powder has the characteristic of absorbing light of certain wavelengths, thus producing a yellow or brown color and, as mentioned above, it is impossible to completely eliminate the impurities from the final product.

It is also extremely difficult to control the particle size of the natural mica within the range required in making high quality pearl pigment. In commercial practice natural mica is subjected to either air or water filtration to obtain particles of properly controlled size. However, even with this precaution, it is absolutely impossible to control the size of the product at about 20 $\mu$, which represents the ideal for pearl pigment manufacture. Ordinarily, the range of particle size in natural mica varies between 5 and 100 $\mu$, thus making it difficult to produce a high pearl luster and particularly difficult to produce good color by optical interference.

SUMMARY OF THE INVENTION

I have found that I am able to make a white lustrous nacreous pigment, or a lustrous nacreous pigment having intense interference color, by uniformly coating transparent to translucent thin crystals of barium sulfate with a homogeneous transparent to translucent thin film of titanium dioxide formed by the hydrolysis in aqueous media of titanium tetrachloride, a water-soluble titanium ester, or a water-soluble titanium salt. The barium sulfate crystals, which can be made to have an average diameter of 5–200 $\mu$ and a thickness of 0.05–1 $\mu$, are an ideal substrate to support the hydrous titanium oxide. By carefully controlling the conditions of hydrolysis, the optical thickness (actual thickness times the index of refraction) of the titanium dioxide film can be provided within a range of 500–20,000 A, which range is required for both high luster white pigment and optically colored pigment. The hydrous titanium oxide film deposited on the crystal surface is dried and then calcined to convert the film to titanium dioxide. The platelets can be further disposed in a conventional manner in a transparent or semi-transparent light-transmitting medium.

DETAILED DESCRIPTION OF THE INVENTION

Figure 1:
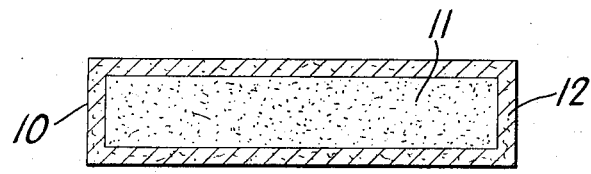
FIG. 1 is an enlarged sectional view of an individual platelet 10, a uniform single crystal of barium sulfate substrate 11 coated with a uniform thin film of titanium dioxide 12.
Figure 2:
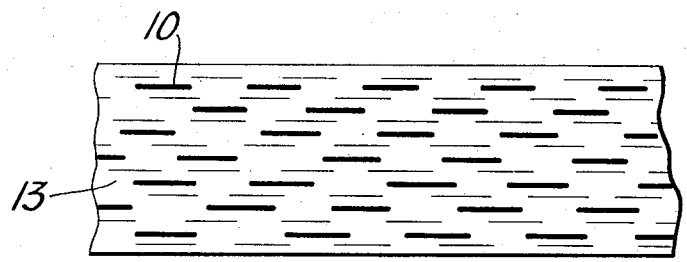
FIG. 2 is an enlarged sectional view of uniformly oriented platelets 10 in a conventional light-transmitting medium 13.

The nacreous pigments of the invention comprise a thin, uniform, transparent or translucent layer of titanium dioxide deposited on a transparent or translucent barium sulfate flake substrate. In order to provide the highly lustrous products of the present invention, it is essential to control the quality of the barium sulfate substrate and the conditions of hydrolysis during which the hydrous titanium oxide is attached to the surface of the substrate.

A common use of ordinary barium sulfate crystals is as a filler in titanium paints. Because of its non-toxic nature, barium sulfate is also used in X-ray work. However, ordinary barium sulfate shows all of the characteristics of a white powder. The surface of these crystals are not flat and smooth and the size distribution varies considerably. Ordinary barium sulfate crystals, when suspended in water, do not exhibit the orientation or flow line characteristics of pearlescent materials. Barium sulfate suitable for use in this invention can be prepared by a carefully controlled recrystallization or by carefully controlled metathesis reaction in very dilute solutions. If produced under controlled conditions, the small, single barium sulfate crystals have the proper partical size and surface smoothness. Such crystals are heat stable, chemically stable and stable against changes in climatic conditions.

It is important in preparing the single crystals of barium sulfate to work with water of high purity and to conduct the recrystallization or metathesis reaction in extremely dilute solutions. In either case, the concentration of the solution should be less than 0.1 mole per liter, preferably in the range of 0.025–0.075 mole per liter. If the concentration of the solution becomes too low, the precipitated crystals are too small, and if the concentration of the solution exceeds 0.1 mole per liter, the resulting crystals have rough, irregular surfaces. As shown in the examples that follow, a concentration between 0.075 and 0.1 mole per liter is borderline. Crystals formed at these concentrations require an after-treatment to make them sufficiently smooth to be a suitable substrate for a nacreous pigment.

Recrystallization is accomplished by dissolving the barium sulfate in sulfuric acid and adding this solution to sufficient pure water to provide a mother liquor having an appropriate concentration of less than 0.1 mole per liter.

If the barium sulfate crystals are made by metathesis; e.g., by the reaction of a barium salt, such as barium chloride, with an appropriate sulfate, such as sodium sulfate or potassium sulfate or ammonium sulfate, effective concentrations are: barium chloride, 0.02–0.1 mole per liter, preferably 0.02–0.03 mole per liter; and sodium sulfate, 0.01–0.1 mole per liter, preferably 0.015–0.03 mole per liter.

The ultimate barium salt concentration of the solution in which the barium sulfate crystals are formed can also be controlled by adding more concentrated reactants to a relatively large volume of a dilute aqueous sulfate solution, such as an ammonium sulfate solution. For example, barium salt solutions and alkali metal or ammonium sulfate solutions of 0.1–0.7 mole per liter can be reacted in a sufficient volume of an ammonium sulfate solution having a concentration of less than 0.01 mole per liter to provide a reaction mixture having a barium salt concentration of less than 0.1 mole per liter.

The pH of the reaction is controlled on the acid side by the addition of a strong mineral acid, such as hydrochloric acid, sulfuric acid, nitric acid, or phosphoric acid. Although the smoothness of the crystals improve if higher temperatures are used for the recrystallization or metathesis reaction, the concentration of the solution and its acidity also affect the smoothness of the crystal surface. An operable temperature range for crystal formation is 30°–100°C.

The substrate particles thus obtained range in diameter from 5–200$\mu$ and have a thickness range of 0.05–1.0$\mu$. Preferred ranges are 10–125$\mu$ in diameter and 0.1–0.7$\mu$ in thickness.

The barium sulfate single crystals are carefully removed from their mother liquor by convenient mechanical separation, such as filtration or centrifugation. The crystals are then added to the hydrolysis solution, in which hydrous titanium dioxide is attached to their surface from the controlled hydrolysis in aqueous media of titanium tetrachloride, water-soluble titanic esters, or water-soluble titanium salts.

The appearance of the nacreous pigment product is determined by controlling the thickness of the translucent layer of titanium dioxide. If the optical thickness $N^d$ (the multiplication product of the actual thickness, $d$, times the index of refraction, N) ranges between 500 and 1,000 A, the product appears to be silver-white. As the optical thickness is increased to 2,000 A, the product becomes gold in appearance. At 2,200 A, the product is pink; at 2,400 A, purple; at 3,000 A, blue; and at 4,000 A, green. Successive interference colors of second order begin with gold at about 4,400 A. The interference colors are repeated in succession up to a thickness of about 20,000 A.

I have found experimentally that, using a preferred barium sulfate single crystal having a particle size of 10–125 $\mu$ in diameter and from 0.2–0.7 $\mu$ in thickness, a final nacreous pigment product containing 19 per cent by weight titanium dioxide reflects a brilliant silver-white color. Pigment containing 25 per cent by weight titanium dioxide reflects gold; 28 per cent by weight, pink; 35 per cent by weight, purple; and 37 per cent by weight, blue. The thickness and uniformity of the deposited hydrous film of titanium oxide depends upon a number of factors, the most important of which are the concentration of the hydrolysis solution, the pH, and the reaction temperature.

The concentration of the titanium salt in hydrolysis medium is maintained between 5 and 60 per cent by weight. If the concentration is too high, crystals of hydrous titanium oxide precipitate in solution and it is difficult to control the deposition on the surface of the barium sulfate crystals. If the concentration of the titanium salt is too low, much time is required to obtain a titanium oxide layer of sufficient thickness deposited on the substrate, and the operation of the process becomes commercially impractical.

The pH is controlled by the addition of up to 5 per cent by weight, based on the weight of the hydrolysis solution, of a strong mineral acid, such as hydrochloric acid, sulfuric, nitric acid, or phosphoric acid or appropriate salts of such acids. Preferred acids are hydrochloric acid and sulfuric acid, and best results are obtained by adding such acids in an amount of 1-3 per cent by weight. The pH of the hydrolysis medium changes during the reaction and is best controlled empirically by measuring the weight per cent of mineral acid added to the hydrolysis solution. If the pH or acid concentration is too high, the titanium oxide does not attach to the barium sulfate layer and uniform crystals are not produced.

The thickness of the titanium oxide layer is controlled between 500 and 20,000 A by varying the concentration of the titanium compound in the aqueous hydrolysis solution and the reaction time, which is a function of both solution concentration and temperature. If the hydrolysis reaction is carried out at the boiling point, hydrolysis is substantially complete within a period of about one hour. If the temperature is below the boiling point, hydrolysis requires a much longer period of time. Desirable reaction temperatures vary between about 70° and 100°C., and operable temperatures are between 20°C. and the boiling point of the reaction medium.

The coated crystals are recovered from the hydrolysis solution and are first dried at a temperature of 75°-300°C., conveniently in two stages; first with moist air at a temperature of 75°-100°C., and then at a temperature of 150°-300°C. to remove water of crystallization. A lustrous product is obtained by calcining the dehydrated crystals at 700°-1,100°C.

The nacreous crystals of the invention are converted by the conventional flushing processes used in the processing of ordinary nacreous pigment to a paste or dispersion that is suitable for usage. Conventionally, nacreous pigments are dispersed in a light-transmitting medium, such as a solution of nitrocellulose in butyl acetate. Other useful media include hydrocarbons, i.e., hexane, xylene, benzene; ester, i.e., ethyl acetate, linseed oil, dibutyl phthalate, dioctylphthalate, dioctyladipate, dioctylazerate, and dioctylsebacate; ketones, i.e., acetone, methylethyl ketone, and methylisobutyl ketone; alcohols, i.e., oleyl alcohol, butanol, meta-cresol, cyclohexanol, ethanol, and methanol; chlorinated hydrocarbons, i.e., carbon tetrachloride, monochlorobenzene, ortho-dichlorobenzene, dichloromethane, chloroform; and miscellaneous organic solvents, i.e., ethyl ether, ether-ethanol mixtures, pyridine, nitromethane, nitrobenzene, ethylene glycol monomethyl ether, diacetone alcohol, and furfural. Also useful are solutions of resins, such as alkyd resins and saturated or unsaturated polyester resins.

The nacreous pigment obtained according to the invention is non-toxic and, in addition, has excellent heat resistance, weather resistance, and resistance against sulfur stain. The product can be used in cosmetics, toys, tablewares, coating of china, and other fields where conventional toxic pearl pigments cannot be applied.

My invention is further illustrated by the following examples:

Example I

Twenty grams of white powdered barium sulfate are dissolved in 200 g. concentrated 98 per cent by weight sulfuric acid by heating to 100°C. The resulting solution is added to 2 liters of pure water maintained at a temperature of 50°C., with stirring. Transparent, smooth, even, rectangular, thin, single crystals, 20 $\mu$ in length and 4 $\mu$ in width, appear in the solution. By carefully controlling the conditions of recrystallization, it is possible to obtain an adequate control of the crystal size and thickness. The crystals are recovered from the aqueous solution by filtration.

Twenty grams of barium sulfate crystals produced according to the foregoing procedure are added to 250 g. of sulfuric acid of three per cent by weight concentration containing 5 grams of ammonium sulfate and 15 g. of titanium tetrachloride. The ammonium titanyl sulfate thus formed is deposited on the surface of the barium sulfate crystals. Hydrolysis is carried out for a period of 70 minutes at 100°C. which results in the attachment of the hydrous titanium oxide to the surface of the barium sulfate. After washing thoroughly with water, the hydrous titanium oxide attached to the surface of the crystals is neutralized with ammonium carbonate and washed thoroughly with 50 cc. of methanol.

The moist crystals are dried first with hot air for a period of one hour at 80°-100°C., and then are baked to remove water of crystallization in a rotating furnace for 100 minutes at 300°C. The resulting fine powdered particles are baked for one hour at 850°C. in an electric furnace. After subsequently cooling, 26 g. of bright, lustrous silver-white pigment is obtained. The optical thickness (actual thickness times index of refraction) of the thin layer of titanium dioxide is about 1,000 A.

Although the dispersibility of the pigment thus obtained in paint vehicles or synthetic resins is relatively good, the dispersibility will become improved by the use of surface-active agents as conventionally practiced in the pearl pigment art.

If the quantity of titanium tetrachloride used under the same reaction conditions is increased to 20 g., then 28 g. of lustrous pearl pigment having a pink interference color is obtained. If the amount of titanium tetrachloride used is increased to 25 g., there is obtained 30 g. of a pearl pigment having a blue interference color.

Example II

The pH of a six-liter solution of barium chloride (0.03 mole/liter is concentration) is adjusted to pH 0.5 by the addition of hydrochloric acid. This solution is added very rapidly to a boiling 12-liter solution of sodium sulfate concentration 0.015 mole/liter). There was thus obtained 40 g. of long, hexagonally shaped, thin, single crystals of barium sulfate; the individual crystals having a length of 15 $\mu$ and a width of 5 $\mu$. It is possible to change the shape of the crystals to make long hexagons, rectangular, or rombic shapes by varying the solution concentration, the pH and the temperature within the ranges indicated as suitable. 40 grams of barium sulfate crystals thus produced are added to a 17 per cent aqueous solution (450 g. of water) containing triethanolamine titanate. With stirring, 50 g. of a 5 per cent by weight aqueous solution of sulfuric acid is added over a 10 minute period. Hydrolysis is then carried out for a 60 minute period at the boiling point of the solution, thereby attaching the hydrous titanium dioxide to the surface of the barium sulfate substrate in uniform layers. After the hydrolysis reaction is complete, the material is dried and calcined in the same manner as in Example I. After the high temperature heating step, 55 g. of golden, lustrous pearlescent pigment is obtained.

Example III

A 5.5 liter barium chloride solution of 0.02 mole/liter concentration is heated to a temperature of 40°C. The resulting solution is rapidly added to ten liters of aqueous potassium sulfate of 0.01 molar concentration at 40°C., and the pH of the resulting solution is adjusted to pH 3 by the addition of hydrochloric acid. By this reaction there is obtained 23 g. of thin, rombic, single crystals of barium sulfate having a length of 20 $\mu$ and a width of 16 $\mu$.

Separately, a solution of 8 g. of sulfuric acid and 11 g. of ammonium sulfate dissolved in 50 g. of pure water is made. To this solution titanium tetrachloride, 16 g., is added. After heating to a temperature of 60°C. and subsequently cooling, 18 g. of transparent crystalline ammonium titanyl sulfate are produced. Seventeen grams of the ammonium titanyl sulfate thus obtained is dissolved by boiling in 250 cc. of hydrochloric acid of 5 per cent by weight concentration. Eighteen grams of single crystals of barium sulfate are added to this solution. Hydrolysis is carried out at a temperature of 60°C. for 100 minutes, resulting in a thin layer of hydrous titanium oxide attached to the surface of the barium sulfate crystals. The material thus obtained was treated according to the procedure of Example I. 23 grams of silver-white pearlescence is thus obtained.

Example IV

A 2-liter aqueous solution having a barium nitrate concentration of 0.075 mole per liter is heated to a temperature of 60°C. This solution is rapidly added to two liters of aqueous potassium sulfate of 0.075 mole per liter concentration at a temperature of 60°C. 35 grams of rombic shaped barium sulfate crystals having a length of 10 $\mu$ and a width of 8 $\mu$ are obtained. The surface of the crystals thus made is slightly irregular. When 30 g. of crystals thus obtained are stirred for 100 minutes at 80°C. in 300 cc. of sulfuric acid solution of 20 percent concentration, the surface irregularities disappear and the resulting surface smoothness is sufficient to make them useful for the preparation of pearl pigment. Thirty grams of crystals thus obtained are added to a combined solution of 90 g. (30 per cent by weight) of titanium tetrachloride and 7.5 g. of sulfuric acid in 750 cc. of pure water. The resulting mixture is heated at 80°C. for a period of 60 minutes. After cooling to 40°C. with continued stirring, the solution is neutralized with a 20 per cent aqueous solution of ammonia. The precipitated hydrous titanium oxide is attached to the barium sulfate in a layer of uniform thickness. By following the after treatment outlined in Example I, 40 g. of lustrous silver-white pearl pigment are obtained.

Example V

Twenty liters of a 0.023 mole solution of barium chloride is adjusted to a pH of 5.0 by the addition of hydrochloric acid. After heating to 60°C., this solution is added continuously over a period of 20 minutes, with rapid stirring, to an aqueous solution of potassium sulfate (0.026 mole/liter concentration) at pH 5.8, maintained at a temperature of 60°C. The crystals thus formed are separated from the reaction mixture by filtration. By this reaction there are obtained 107 g. of thin, oblong, single crystals of barium sulfate, the crystals being 60 $\mu$ in length and 20 $\mu$ in width. A 100 g. quantity of these single crystals of barium sulfate are mixed with 550 g. of hydrochloric acid of one per cent by weight concentration containing 110 g. of titanium phosphate. With stirring, the resulting solution is neutralized by the addition of 20 per cent aqueous ammonia, 375 cc. Titanium oxide was attached to the surface of the barium sulfate in a uniform layer. The resulting crystals were washed with water until the odor of ammonia disappeared. The crystals were then dried for 1 hour at 100°C. By drying and calcining as described in Example I, 135 g. of a lustrous pearl pigment exhibiting a pink interference color are obtained.

Example VI

Three parts by weight of barium sulfate crystals, prepared as described in Example I, are added to an aqueous solution of titanium tetrachloride having an adjusted concentration of 30–40 per cent by weight. The pH of the solution is adjusted by added 0.25 part of 98 percent of sulfuric acid. By varying the reaction time from 1 to 1½ hours at 100°–150°C., and adjusting the quantity of titanium tetrachloride added to the hydrolysis solution so that between 10–60 percent by weight titanium oxide is deposited on the surface of the barium sulfate crystals, lustrous pigments having titanium dioxide layers of various thicknesses are produced.

Example VII

A 0.7 liter quantity of aqueous ammonium sulfate solution of 0.4 mole per liter concentration and a separate 0.7 liter quantity of aqueous barium chloride solution of 0.4 mole per liter concentration were heated to a temperature of 40°C respectively. The resulting solutions were simultaneously added dropwise to ten liters of aqueous ammonium sulfate solution of 0.005 mole per liter concentration with slow stirring and maintained at 45°C. The addition was complete in 30 minutes and provided a reaction mixture having an ultimate barium salt concentration of less than 0.1 mole per liter. By this reaction there was obtained approximately 62g of rectangular crystalline platelets of barium sulfate having a length of 100–125 and a thickness of about 0.5–0.6 $\mu$.

The 60g of crystals thus obtained were dispersed in 0.6 liter of water. A 25g quantity of titanyl salt solution was added to the suspension.

After boiling the suspension for a 60 minute period, the suspended materials were separated from the suspension and washed with water. The moist crystals were dried and calcined in the same manner as in Example I. By this procedure there was obtained about 68g of white bright and flaky-like powder.

I claim:

1. A method of making a highly lustrous nacreous pigment consisting essentially of substantially uniform crystalline platelets, the individual platelets consisting of:

1. a substrate of transparent to translucent single crystals of barium sulfate having a diameter of 5–200µ and a thickness of 0.05–1.0 µ, and
2. a uniform transparent to translucent outer coating of titanium dioxide attached to said barium sulfate crystal, the thickness of said outer coating being 500–20,000 A, said pigment being made by the steps comprising:
   a. adding substantially uniform barium sulfate crystals, prepared from a dilute aqueous solution having a barium salt concentration of less than 0.1 mole per liter to an acidic aqueous solution of titanium tetrachloride, a titanium ester or a titanium salt, the concentration of the titanium compound being between 5–60 per cent by weight, based on the weight of the hydrolysis solution,
   b. maintaining the resulting solution at a temperature between 20°C. and the boiling point of the solution for a time sufficient to effect hydrolysis and to attach to the surface of the barium sulfate crystals a hydrous coating of titanium oxide having a thickness between 500–20,000 A, and
   c. drying and calcining the resulting crystals to convert the hydrous titanium oxide to a lustrous thin film of titanium dioxide.

2. Method according to claim 1 in which the pH of the hydrolysis solution is adjusted by adding up to 5 per cent by weight of a strong mineral acid.

3. Method according to claim 1 in which the thickness of the outer coating of titanium dioxide is between 500–1,000 A and the product is a white lustrous pigment.

4. Method according to claim 1 in which the thickness of the outer coating of titanium dioxide is between 2,000–20,000 A and the product is an iridescent lustrous pigment.

5. Method according to claim 1 in which the temperature of hydrolysis is between 70°C. and the boiling point of the solution.

6. Method according to claim 1 in which the product is dried at 75°–300°C. and calcined at 700°–1,100°C.

7. Method according to claim 1 wherein the barium sulfate crystals have a diameter of 10–125µ and a thickness of 0.05–0.7µ.

8. Method according to claim 1 wherein the ultimate concentration of the solution in which the barium sulfate crystals are formed is controlled to a concentration of less than 0.1 mole per liter by admixing substantially stoichiometric quantities of a barium salt solution having a concentration of 0.1–0.7 mole per liter and an alkali metal or ammonium sulfate solution having a concentration of 0.1–0.7 mole per liter in a sufficient volume of an ammonium sulfate solution having a concentration of less than 0.01 mole per liter.

9. A highly lustrous nacreous pigment consisting essentially of substantially uniform nacreous crystalline platelets, the individual platelets consisting of (1) a substrate of transparent to translucent single crystals of barium sulfate originating from a dilute aqueous solution having a barium salt concentration of less than 0.1 mole per liter, said single crystals having a diameter of 5–200 microns and a thickness of 0.05 to 1 micron, and (2) a uniform transparent to translucent outer coating of titanium dioxide attached to each of said barium sulfate crystals, the thickness of the outer coating being 500–20,000 angstroms.

* * * * *